US006277901B1

(12) United States Patent
Hensel

(10) Patent No.: US 6,277,901 B1
(45) Date of Patent: Aug. 21, 2001

(54) RUBBER ADDITIVE GRANULATE, A PROCESS FOR ITS PREPARATION AND ITS USE

(75) Inventor: Manfred Hensel, Hamburg (DE)

(73) Assignee: Schill & Seilacher GmbH & Co., Hamburg (DE)

( * ) Notice: Subject to any disclaimer, the term of this patent is extended or adjusted under 35 U.S.C. 154(b) by 0 days.

(21) Appl. No.: 09/105,142

(22) Filed: Jun. 26, 1998

(30) Foreign Application Priority Data

Jun. 26, 1997 (DE) ............................................. 197 27 848

(51) Int. Cl.$^7$ ....................................................... C08K 9/10
(52) U.S. Cl. ..................... 523/201; 523/205; 523/207; 523/210; 523/215; 523/216; 523/217
(58) Field of Search .................................... 523/201, 205, 523/207, 210, 215, 216, 277

(56) References Cited

U.S. PATENT DOCUMENTS 5,055,500 * 10/1991 Peters et al. ......................... 523/319

FOREIGN PATENT DOCUMENTS

| 4015054 | 11/1990 | (DE) . |
| 3935815 | 5/1991 | (DE) . |
| 2 603 273 | 3/1988 | (FR) . |

* cited by examiner

Primary Examiner—Edward J. Cain
(74) Attorney, Agent, or Firm—Collard & Roe, P.C.

(57) ABSTRACT

The invention relates to an additive compositions for rubbers and rubber mixtures which contain at least one solid, powdery substance and at least one dispersant, the at least one additive substance being coated with the at least one dispersant. The compositions are present as granulate and are prepared by means of a multi-stage fluidized-bed process. The invention also relates to the use of the additive compositions in the preparation of rubber and products obtained using them.

18 Claims, 1 Drawing Sheet

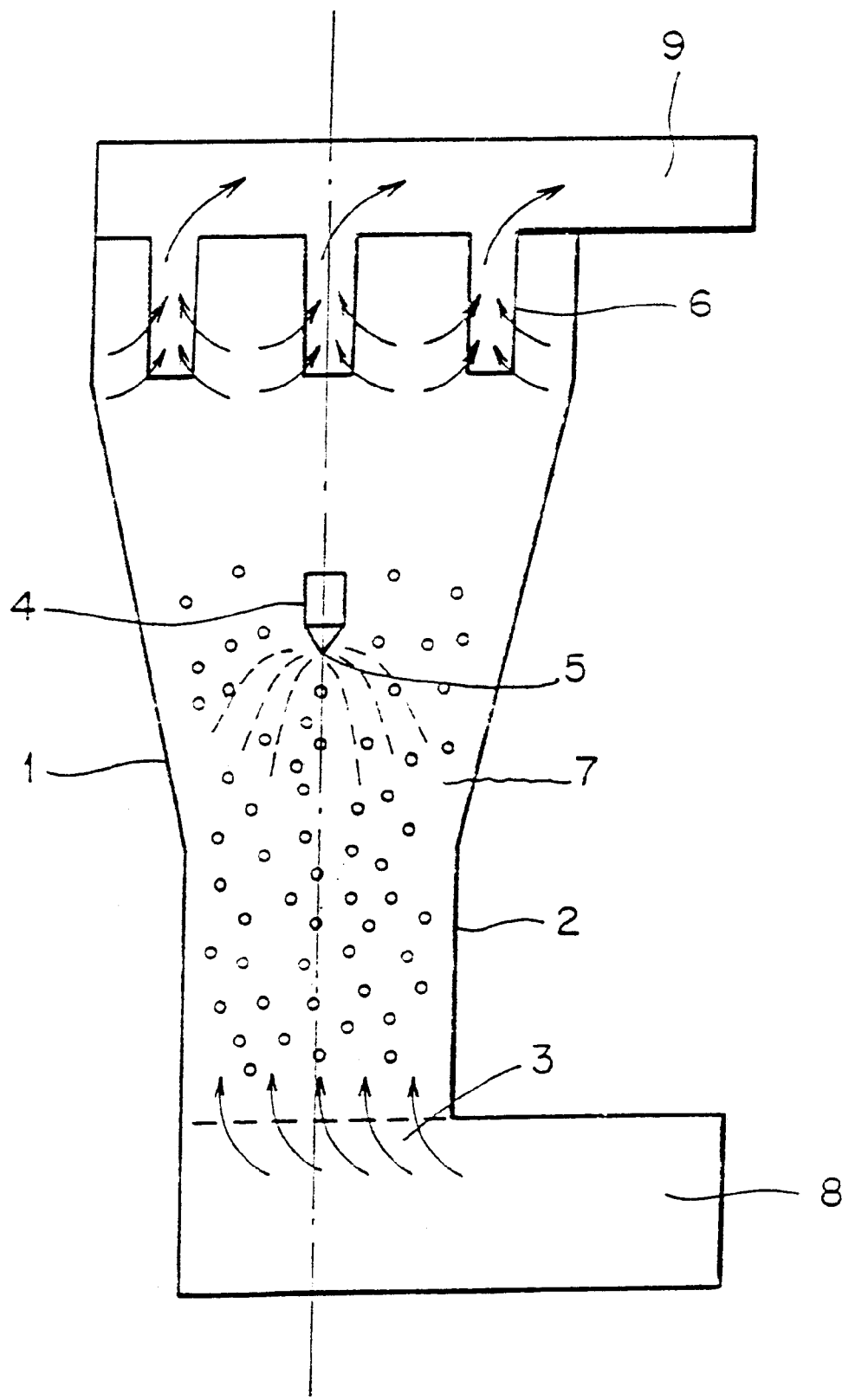

RUBBER ADDITIVE GRANULATE, A PROCESS FOR ITS PREPARATION AND ITS USE

The invention relates to a rubber additive granulate, to a process for its preparation by means of fluidized-bed technology, to its use in the preparation of rubber mixtures and to rubber mixtures and products created using it.

In the preparation of rubber mixtures for rubber production, liquid and solid substances are mixed with the rubber or the rubbers. The solids are on the one hand substances having melting or softening points below the processing temperature and on the other hand substances which are not present in molten or softened form at the processing temperature. From the point of view of solubility, the solids to be mixed in can be divided into those which are well soluble in rubber, those which are not soluble in rubber and various intermediate forms.

The more poorly soluble the substances and in particular the solids are, and the higher the melting point or the less the softening at the processing temperature, the more difficult is their dispersion.

The incorporation and the distribution, i.e. the dissemination of the solids is decisively determined by the form in which they are supplied as a commercial product to the rubber-processing industry: fine powders form clouds of dust which are often also frequently electrostatically charged, so that mixing-in losses, unhealthy dust formations and workplace contamination result. Fine powders also often form agglomerations upon incorporation, which cannot be broken up again with the forces occurring in the rubber mixture, so that deficient distribution and dispersion qualities result.

Coarse powders or substance granulates are more likely to have small dust contents and in most cases can be better incorporated into the rubber. However, it must be guaranteed that the forces occurring in the mixture are capable of mechanically reducing and distributing the coarse particles to an adequate degree.

It is the state of the art to store solid substances for rubber production in silos or at least place them in day silos. They are removed from such silos by screws, conveyor belts and/or pneumatic conveyance to the automatic weighing station and onward from there to be fed into the mixing unit. While in storage and also when being transported by the producer to the rubber-processing plant, powders, in particular fine powders, tend to cake depending on the stacking height or layer thickness, as a result of which an automatic further processing is ruled out.

While in storage, powders are also exposed, unprotected, to environmental influences such as for example humidity, oxygen, carbon dioxide and nitric oxides, as a result of which caking or even chemical reactions result. The consequence is that they cannot be transported and/or there is a diminution of the effect of the additive in the rubber mixture.

When powders are being transported from the silo to the mixing unit, other possible occurrences are caking, incrustation, bridging in pipes, an increase in the dust content as a result of mechanical reduction of coarser constituents in the powders and wear in the transport apparatus caused by abrasive, i.e. grinding solids or constituents of solids.

Solutions described hitherto in the state of the art to the problems listed above follow various routes, which are briefly explained in the following:

1. The powdery substances are bound with various oils, in most cases mineral oil, and/or other non-polymeric ingredients, optionally subjected to a special physical treatment and then marketed as a non-dust-forming, easy-flowing powder, as a paste or in the form of small rods measuring several millimetres, cylinders, flakes, scales, lozenges or balls. These forms offer various advantages compared with the original finely powdered form: some lie in the weighing and feeding steps, some in the smaller dust content and in a reduced electrostatic charge, others in more rapid incorporation and distribution, and yet others in protection against humidity and carbon dioxide. However, it is rare for more than two of the said possible advantages to be obtained at the same time, with the result that these forms of product can be described as technically satisfactory only in special cases.

2. The rubber-processing industry itself produces pre-mixtures, so-called batches. A rubber which is also used in the main mixtures is mixed with powdery chemicals or chemicals bound in accordance with point 1 and optionally with other constituents customary in rubber processing such as oils and processing additives and then added to the main mixtures. However, problems often result during storage and feeding, as such batches do not permit automatic feeding with customary processes. Moreover, there remain the problems of finely powdered substances or those treated in accordance with point 1 during processing, albeit in the preparation of the pre-mixture, instead of the main mixture.

3. The chemicals are bound into a matrix comprising higher-molecular-weight cross-linked materials such as factices or epoxidized fatty acid triglycerides which have been cross-linked by means of dicarboxylic acids, as is described in DE 39 20 411, and the like. The matrix is firm and as dust-free as possible under the transport conditions. Under incorporation conditions, it melts or undergoes mechanical decomposition. The remaining problems are in this case stability of the transport form, silo storage plus automatic transport, weighing and feeding. Moreover, compatibility with the rubber mixture does not always obtain. The homogeneity of the distribution with this product form is decisively determined by the particulate fineness of the powdery chemicals upon incorporation into the matrix.

4. The chemicals are bound in a matrix comprising elastomeric polymerizates with thermoplastic properties and supplied to the rubber-processing industry in the form of cylinders or cubes having diameters measuring a few millimetres. In most cases the matrix consists of ethylene/vinyl acetate copolymer and/or ethylene/propylene co- or terpolymer together with oil and dispersants based on fatty acids, as is described in DE 21 23 214. The problems of dust generation and of automatic feedability are thus solved. However, there are still dispersion problems. These result either from the fact that the polymers using for binding are compatible with only some of the rubbers used in the rubber-processing industry, and/or the fact that the created particles are too hard for the rubber mixture into which they are to be incorporated. In addition, a longer incorporation time is necessary, because of the particle size.

5. It is merely a further development of the method according to point 3 to disperse the substance in a polymerizable liquid and then polymerize this, as described in EP-A-0 625 543, especially if, as is described in the patent, the solid powdery substance is mixed together with a so-called ester plasticizer into natural or epoxidized natural fatty acid triglyceride, and polybasic acid is then added in the form of phosphoric acid and the composition is thus cross-linked to give a product which is somewhat plastic but can be made to crumble. Although this form is dust-free and can be obtained for a smaller energy outlay and with a better homogeneity, relative to the chemicals preparation that is to be mixed in, compared with the method according to point 4, it also has the disadvantages listed in point 3.

The object of the present invention is accordingly to provide rubber additives in a composition which is suitable for use in rubber or rubber mixtures. The additives are to be capable of being readily incorporated into the rubber and display a high degree of effectiveness in the rubber or in the rubber mixture. The compositions are also to be characterized by good a dispersability in the rubber and good compatibility with customary rubbers and with one another. In addition, the formulation of the composition is to guarantee stability during transportation and storage and be processing-friendly (no dust formation, rapid processability).

A further object of the invention is to provide a process for the preparation of this rubber additive composition.

Finally, it is the object of the present invention to provide rubber mixtures and products prepared using the additive composition.

This object is achieved by an additive composition for rubber and rubber mixtures which contains at least one solid, powdery additive substance and at least one dispersant and is characterized in that the at least one additive substance is coated with the at least one dispersant and the composition is present as granulate or microgranulate.

Preferred versions of the invention are the subject-matter of the dependant claims.

The additive substances are selected from rubber chemicals and additives. Mastication chemicals, vulcanization chemicals, anti-aging and anti-fatigue chemicals, fillers, pigments, plasticizers, factices, propellants, adhesives and other auxiliaries, in particular vulcanization chemicals such as vulcanizing agents, vulcanization accelerators and retarders and acceleration activators are of interest as constituents of the compositions according to the invention.

In particular, additive substances are proposed for use in the process according to the invention which have a high melting point or tend to become charged upon mixing-in or have a large specific surface such as for example highly-active zinc oxide and/or are used only in small quantities upon mixing into rubbers.

The dispersant used as coating material is selected from waxy dispersants, which include for example fatty acids, fatty alcohols, products from the reaction of fatty acids with alcohols as well as fats, in particular wool fat.

Fatty acids of the chain lengths $C_{12}$–$C_{30}$, fatty alcohols of the chain lengths $C_{12}$–$C_{30}$ and ester waxes obtained by esterification of the aforementioned acids and alcohols, esters of fatty acids of the chain lengths $C_{12}$–$C_{30}$ with diols and/or polyols such as e.g. ethylene glycol, polyethylene glycol, glycerol, trimethylolpropane, pentaerythritol, dipentaerythritol and the like, also ester waxes of natural origin such as e.g. carnauba wax, beeswax and montan wax are suitable for the coating of the additive substances.

Wool wax and related products such as e.g. wool fat fatty acids, wool fat alcohols and its distillation residues are also suitable for the coating of the additive substances.

Furthermore, paraffin waxes and oxidized paraffins (oxide waxes), amides of fatty acids of the chain lengths $C_{12}$–$C_{30}$ such as e.g. stearic acid amide, erucic acid amide and N-substitution products thereof such as for example stearic acid ethanolamide are suitable as coating materials for the additive substances according to the invention.

Finally, emulsifiers such as for example fatty or oxoalcohol ethoxylates, soaps, sulphonates as well as lecithin also represent suitable coating materials.

Combinations of the aforementioned substances can also be used for coating.

Substances or substance combinations which have a waxy consistency at room temperature and melt at ca. 40 to 100° C. and thus facilitate mixing into the rubber and improve the distribution of the chemicals preferably come into consideration as coating agents.

A particularly suitable additive substance is thus zinc oxide and a particularly suitable dispersant is wool fat or a combination of wool fat and fatty acid esters.

The composition according to the invention preferably comprises, relative to its total quantity, 90 to 20 wt.-% additive substance(s) and 10 to 80 wt.-% dispersant, more preferably 90 to 40 wt.-% additive substance(s) and 10 to 60 wt.-% dispersant and most preferably 85 to 65 wt.-% additive substance(s) and roughly 15 to 35 wt.-% dispersant.

The composition according to the invention is present as a granulate or microgranulate, the granulate particles or microgranulate particles preferably having a size of 0.1 to 10 mm and more preferably of 2 to 5 mm.

One version of the invention is explained with reference to FIG. 1, which shows a sectional picture of a fluidized-bed reactor (1) suitable for the process according to the invention.

The preparation of the granulate according to the invention takes place in a fluidized-bed reactor such as is represented for example in FIG. 1. In a first step of the process according to the invention, a stable fluidized bed (7) is created in the fluidized-bed reactor in the turbulence chamber (2) with the powdery additive substances mentioned above by means of a supply of air (8) at a flow velocity suitable for the reactor size in question.

Powders which are present in finely-powdered form and preferably have a diameter of less than 100 $\mu$m on average are preferred.

The supplied air is removed from the reactor (9) via a filter (6) after flowing through the turbulence chamber, so that no material is removed with it.

In a second step of the process according to the invention, the coating material (4) which in this case is liquid (optionally melted beforehand) is then introduced into the fluidized bed via a spraying nozzle (5), by which means the powder grains are coated in a controlled manner.

An addition of the dispersant in powder form simultaneously with the additive substance(s) is also possible if the dispersant is melted by supplying hot air.

In an optional third step of the process according to the invention, there is an agglomeration of the individual coated powder grains up to the desired agglomerate diameter.

Finally the finished product, i.e. the granulate according to the invention, is removed from the reactor space in the last step of the process.

The granulate obtained by means of the process according to the invention is dust-free and thus processing-friendly. The granulate particles are stable and show no fractures or caking during transportation, during storage in bags or silos or during the automatic weighing or feeding.

The subject-matter of the invention is also the use of the additive composition according to the invention, after its preparation described above, in rubbers or rubber mixtures, in particular for rubber manufacture.

The coating material according to the invention is well soluble in the rubber material into which the granulate is to be incorporated, and displays a dispersant effect. In addition, it is compatible with all the rubbers that are usual in the rubber-processing industry. It therefore has no harmful effect whatever on the mixing process, the mixture, the shaping and vulcanizing process and on the rubber end-product.

The influence is clearly positive: since the coating material itself acts as a dispersion additive and also as a flow additive in many rubbers, the dispersion is improved in the whole rubber mixture. This also helps to facilitate the later shaping process.

In addition to the good compatibility of the coating material with the rubbers, this is also a consequence of the structure of the granulates according to the invention. As for example agglomerates of very fine particles the granulates, upon incorporation on rubber mixtures, immediately after their incorporation and wetting by the rubber material itself, are broken down by such small shearing forces as prevail for example in flexible mixtures on mixing rolls to the primary particles which are clearly smaller but still carry a coating by melting of the dispersant and optimally distributed in the mixture (dispersion). Because of the solubility of the coating, the coating gradually enters the rubber material and leaves behind the fine small powder grain optimally distributed with undisturbed activity.

The smaller size of the granulate particles compared with polymer-bound chemicals is one reason why the incorporation of the compositions according to the invention can take place perceptibly more quickly. Since these granulates also display no elasticity in comparison with polymer-bound chemicals, there are also no material losses on the mixing roller due to granulate particles jumping out.

The quicker and easier incorporation contributes to the fact that the consumption of energy during the preparation of rubber mixtures and products using the additives prepared according to the invention is significantly less compared with the polymer-bound chemicals method.

The dispersion quality is optimum because of the above-described incorporation mechanism and also better in the case of difficult rubber mixtures and chemicals that are difficult to disperse than in that of all other preparations of chemicals.

Rubbers, rubber mixtures or rubber products manufactured using the additive compositions according to the invention are thus also the subject-matter of the present invention.

Since the coating means is compatible with all the rubbers used in the rubber-processing industry, there are also no problems with polymer phases or with incompatibly encased chemicals, an effect which likewise contributes to the advantageous properties of the rubbers obtained using the compositions according to the invention.

The invention is described in more detail in the following with reference to an embodiment. In each case the parts by weight given in the formulations are relative to 100 parts by weight rubber in the mixture.

Example

In the following, a zinc oxide granulate and its preparation as well as the technical advantage of its incorporation into a rubber mixture compared with untreated zinc oxide powder is described.

Zinc oxide is a rubber chemical which does not melt during processing and is not soluble in rubber. In addition, the optimum dispersion of the zinc oxide forms the basis for an optimally homogeneous cross-linking of the rubbers by means of sulphur and various accelerators. Zinc oxide is one of the most difficult rubber chemicals to disperse. An inadequate dispersion is to be recognized from the value level of the physical data of the vulcanizate, as they are listed in Table 3.

The zinc oxide used had a particularly large surface: "SILOX ACTIF" from the company Silox S.A., Belgium, with a surface, measured according to BET, of 42 m²/g. Zinc oxide types normally used for rubber mixtures have surfaces of 2 to 4 m²/g. It is the state of the art to use such so-called "active" zinc oxide types in untreated form in rubber mixtures for rubber manufacture, in order to clearly reduce the total quantity of zinc oxide. However, the incorporation and the homogeneous dispersion of such zinc oxides is extremely difficult. It is precisely in this that the advantages of the invention can be demonstrated.

The zinc oxide was 95.5% pure according to the analysis certificate, had a drying loss of 0.71% at 105° C., a screening residue (44 µm screen) of 0.08%, a bulk density of 800 g/l and a water-soluble portion of 0.8%.

This powder was coated according to the invention in a fluidizedbed reactor such as is represented for example in FIG. 1. (Total) input quantities of 1250 to 2500 g zinc oxide and coating material and air flows of 50 to 70 m³ per hour were necessary. A 66% substance content, i.e. ZnO content, was established. A wool fat/fatty acid ester mixture was used as coating material.

The granulate was incorporated into a natural rubber/polybutadiene blend mixture (SMR 10, Buna CB 10) reflecting conditions found in practice. Various quantities of zinc oxide granulate were used with the designation zinc oxide preparation according to the invention, in order to show the effectiveness of the zinc oxide which is based on an optimum dispersion. The three chosen quantities of zinc oxide preparation correspond to 3, 2 and 1 parts by mass of zinc oxide together with 1.8, 1.2 and 0.6 parts by mass of the wool fat/ester mixture per 100 parts rubber (abbreviated to: phr). Furthermore, an aromatic disulphide/fatty acid ester mixture (STRUKTOL A 82) was used as a chemical decomposition means for natural rubber, carbon black (STATEX N-550) as a solid reinforcing filler, isopropyl-phenyl-p-phenylenediamine (IPPD) and polymerized trimethyl-dihydroquinoline (TMQ) as anti-aging means, the ozone-protection wax Protector G 32 (micro-crystalline paraffin wax), stearic acid, a sulphur preparation (STRUKTOL SU 109) and, as vulcanization accelerators, N-tert.-butyl-2-benzothiazole sulphenamide (TBBS) and diphenylguanidine (DPG).

Table 1 gives an overview of the produced mixtures.

TABLE 1

| Component | Mixture 1 | Mixture 2 | Mixture 3 | Mixture 4 |
|---|---|---|---|---|
| Natural rubber SMR 10 | 80 | 80 | 80 | 80 |
| Polybutadiene rubber Buna CB 10 * (1) | 20 | 20 | 20 | 20 |
| STRUKTOL A 82* (2) | 0.6 | 0.6 | 0.6 | 0.6 |
| Carbon black STATEX N-550* (3) | 42 | 42 | 42 | 42 |
| Anti-aging means IPPD | 3 | 3 | 3 | 3 |
| Anti-aging means TMQ | 2 | 2 | 2 | 2 |
| Ozone-protection wax Protector G32* (4) | 3.5 | 3.5 | 3.5 | 3.5 |
| Stearic acid | 2 | 2 | 2 | 2 |
| Zinc oxide SILOX Actif* (5) | 3 | 0 | 0 | 0 |
| Zinc oxide preparation according to the invention | 0 | 4.8 | 3.2 | 1.6 |
| Sulphur preparation STRUKTOL SU 109* (2) | 1.9 | 1.9 | 1.9 | 1.9 |
| Vulcanization accelerator TBBS | 1.5 | 1.5 | 1.5 | 1.5 |
| Vulcanization accelerator DPG | 0.3 | 0.3 | 0.3 | 0.3 |

* Names of commercial products
Manufacturer/supplier
(1) Bayer AG, Leverkusen
(2) Schill + Seilacher, Hamburg
(3) Columbian Carbon, Hanover
(4) Fuller
(5) Silox S.A., Belgium In the following Table 2, the relevant physical data characterizing the cross-linking behaviour are listed, which allow a conclusion to be drawn regarding the distribution or dispersion of the additive substances.

With the same mixture viscosity of ML(1+4)100=48 according to DIN 53523, the mixtures gave the following differences listed in Table 2 in the cross-linking characteristics according to DIN 53529, measured with the MDR rheometer from the company Alpha Technology at 150° C.

TABLE 2

| Property | Mixture 1 | Mixture 2 | Mixture 3 | Mixture 4 |
| --- | --- | --- | --- | --- |
| Turning moment ML [dNm] | 1.86 | 1.9 | 1.9 | 1.96 |
| Turning moment MH [dNm] | 17.08 | 17.18 | 17.14 | 16.47 |
| Time after 10% turning moment increase [min] | 2.1 | 2.32 | 2.33 | 1.96 |
| Time after 90% turning moment increase [min] | 5.02 | 5.29 | 5.13 | 4.13 |

It is deduced from the MH values of Table 2 that, compared with mixture 1, mixture 2 reacts with a higher cross-linking yield for the same zinc oxide content, and a reduction of the effective quantity of zinc oxide to 2 phr in mixture 3 already achieves a similar cross-linking yield to mixture 1. This is shown for example by the MH measurement values. (The quantity data for the zinc oxide preparation according to the invention in Table 1 contain, as explained above, the components 3.0 Zno and 1.8 dispersant in the case of mixture 2, the components 2.0 ZnO and 1.2 dispersant in the case of mixture 3, and the components 1.0 ZnO and 0.6 dispersant in the case of mixture 4).

The Shore hardness according to DIN 53505 and the compression set according to DIN 53517 also show, as is to be deduced from Table 3, that the cross-linking density of mixture 2 is clearly higher than that of mixture 1. This in turn shows that the distribution of the supplied additive substances has been much better in the case of mixture 1 according to the invention than in the case of comparison mixture 2. A reduction of the effective quantity of zinc oxide to 2 phr in mixture 3 gives similar values to mixture 1. However, a reduction of the effective quantity of zinc oxide to 1 phr in mixture 4 leads to a lower cross-linking density.

TABLE 3

| Property | Mixture 1 | Mixture 2 | Mixture 3 | Mixture 4 |
| --- | --- | --- | --- | --- |
| Shore hardness A in % relative to mixture 1 | 100 | 102 | 100 | 98 |
| Compression set [%] 24 hours, 70° C., 25% compression | 16 | 15.5 | 16 | 20 |

The incorporation time of the zinc oxide preparations according to the invention, ascertained optically upon mixing-in on the mixing rolls, was clearly smaller compared with unprepared zinc oxide. No differences were to be seen between mixtures 2 to 4, as the values in Table 4 show:

TABLE 4

| Property | Mixture 1 | Mixture 2 | Mixture 3 | Mixture 4 |
| --- | --- | --- | --- | --- |
| Mixing-in time, ascertained optically in % relative to mixture 1 | 100 | 51 | 45 | 44 |

The preparation according to the invention of the zinc oxide thus leads to a significant reduction in the mixing-in time and, as is to be seen from the cross-linking characteristics, to a finer-particled dispersion and more homogeneous distribution of the supplied additive substance.

What is claimed is:

1. Process for the preparation of an additive composition for rubber and rubber mixtures which contains at least one solid, powdery additive substance (a) and at least one dispersant (b), and said at least one additive substance is coated with the at least one dispersant and the composition is present as granulate or microgranulate, comprising the steps of coating the additive substance with the dispersant by means of a fluidized-bed, whereby in a first step creating a fluidized bed with one or more powdery additive substances comprising powder grains in a fluidized-bed reactor, and in a second step adding one or more dispersants as coating material to the fluidized bed, as a result of which the power grains are coated.

2. Process according to claim 1, wherein in a third step an agglomeration of the coated powder grains up to a desired agglomerate diameter takes place.

3. Rubber, rubber mixture or rubber product which has been prepared using an additive composition for rubber and rubber mixtures which contains at least one solid, powdery additive substance (a) and at least one dispersant (b), and said at least one additive substance is coated with the at least one dispersant and the composition is present as granulate or microgranulate.

4. Rubber additive composition which contains (a) at least one solid, powdery rubber additive substance selected from the group consisting of mastication chemicals, vulcanization chemicals, anti-aging- and anti-fatigue chemicals, fillers, pigments, plasticizers, factices, propellants, adhesives and mixtures thereof; and (b) at least one waxy dispersant selected from the group consisting of fatty acids, fatty alcohols, products from the reaction of fatty acids with alcohols, fats, fatty acid amides, paraffin waxes, paraffin, and mixtures thereof; and wherein the at least one rubber additive substance (a) is coated with the at least one dispersant (b) and the rubber additive composition is present as granulate or microgranulate.

5. Rubber additive composition according to claim 4, wherein the vulcanization chemicals are selected from the group consisting of vulcanizing agents, vulcanization accelerators and retarders and acceleration activators.

6. Rubber additive composition according to claim 4, wherein the dispersant is wool fat.

7. Rubber additive composition according to claim 4, wherein the dispersant has a waxy consistency at room temperature and melts at temperatures of 40° C. to 100° C.

8. Rubber additive composition according to claim 4, wherein the rubber additive substance (a) is zinc oxide and the dispersant (b) contains wool fat and fatty acid ester.

9. Rubber additive composition according to claim 4, wherein the granulate particles have a size of 0.1 to 10 mm.

10. Rubber additive composition according to claim 4, wherein the granulate particles have a size of 2 to 5 mm.

11. Rubber additive composition according to claim 4, which, relative to the composition, contains the following components:
(a) 90 to 20 wt.-% rubber additive substance and
(b) 10 to 80 wt.-% dispersant.

12. Rubber additive composition according to claim 4, which, relative to the composition, contains the following components:
(a) 90 to 40 wt.-% rubber additive substance and
(b) 10 to 60 wt.-% dispersant.

13. Rubber additive composition according to claim 4, which, relative to the composition, contains the following components:
(a) 85 to 65 wt.-% rubber additive substance and
(b) 15 to 35 wt.% dispersant.

14. Rubber additive composition according to claim 4, which, relative to the composition, contains the following components:
(a) roughly 66 wt.-% rubber additive substance and
(b) roughly 34 wt.-% dispersant.

15. Process for the preparation of an additive composition for rubber and rubber mixtures which contains at least one solid, powdery additive substance (a) and at least one dispersant (b), wherein the at least one additive substance is coated with the at least one dispersant and the composition is present as granulate or microgranulate, comprising coating the additive substance with the dispersant in a fluidized bed, whereby in a first step creating a fluidized bed of powder grains with one or more powdery additive substances in a fluidized bed reactor, and in a second step adding one or more dispersants as coating material to the fluidized bed, so that the coated powder grains are produced.

16. Process according to claim 15, wherein in a third step agglomerating the coated powder grains up to a desired agglomerate diameter.

17. Method for the preparation of rubber or rubber mixtures, wherein a rubber additive composition contains at least one solid, powdery additive substance (a) and at least one dispersant (b), wherein the at least one additive substance is coated with the at least one dispersant and the composition is present as granulate or microgranulate, which composition is prepared by coating the rubber additive substance with the dispersant in a fluidized bed comprising the steps of in a first step creating a fluidized bed with one or more powdery additive substances in a fluidized bed reactor; and in a second step adding one or more dispersants as coating material to the fluidized bed, as a result of which coated powder grains are produced and are incorporated into a rubber or rubber mixture.

18. Rubber, rubber mixture or rubber product which has been prepared using a composition of claim 4.

* * * * *